(12) United States Patent
Tippett

(10) Patent No.: US 8,838,868 B2
(45) Date of Patent: Sep. 16, 2014

(54) COMMUNICATION PORT AND CONNECTOR

(75) Inventor: Matthew Tippett, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 12/971,481

(22) Filed: Dec. 17, 2010

(65) Prior Publication Data
US 2012/0159034 A1 Jun. 21, 2012

(51) Int. Cl.
*G06F 13/20* (2006.01)

(52) U.S. Cl.
CPC ........................... *G06F 13/20* (2013.01)
USPC ................ 710/313; 439/38; 439/39; 439/40; 439/607.01; 439/660; 455/39; 455/425; 455/557

(58) Field of Classification Search
CPC ....................... H01R 13/6205; H01R 13/6456; G06F 11/3013
USPC ......... 710/313; 439/660, 607, 38–40; 455/39, 455/425, 557
See application file for complete search history.

(56) References Cited

U.S. PATENT DOCUMENTS

| | | | | |
|---|---|---|---|---|
| 5,163,856 A | * | 11/1992 | McGaffigan et al. | 439/874 |
| 5,242,318 A | * | 9/1993 | Plass | 439/620.1 |
| 5,555,332 A | * | 9/1996 | Dean et al. | 385/53 |
| 5,835,793 A | * | 11/1998 | Li et al. | 712/300 |
| 6,869,316 B2 | * | 3/2005 | Hinkle et al. | 439/675 |
| 7,311,526 B2 | * | 12/2007 | Rohrbach et al. | 439/39 |
| 7,321,766 B2 | * | 1/2008 | Liu et al. | 455/425 |
| 7,532,820 B2 | * | 5/2009 | Aronson | 398/135 |
| 7,594,059 B2 | * | 9/2009 | Townsend | 710/313 |
| 7,670,181 B2 | * | 3/2010 | Tu et al. | 439/607.01 |
| 7,865,629 B1 | * | 1/2011 | Tantos et al. | 710/11 |
| 7,956,618 B2 | * | 6/2011 | Lundquist et al. | 324/538 |
| 7,980,898 B2 | * | 7/2011 | Chatterjee | 439/660 |
| 7,999,483 B2 | * | 8/2011 | Trattler | 315/241 P |
| 8,000,753 B2 | * | 8/2011 | Choi et al. | 455/569.1 |
| 8,108,508 B1 | * | 1/2012 | Goh et al. | 709/224 |
| 8,136,085 B2 | * | 3/2012 | Skillman et al. | 717/100 |
| 8,167,625 B2 | * | 5/2012 | Shedletsky | 439/55 |
| 8,272,876 B2 | * | 9/2012 | Schultz | 439/38 |
| 8,351,178 B2 | * | 1/2013 | Chen et al. | 361/144 |
| 8,353,729 B2 | * | 1/2013 | Dabov et al. | 439/668 |
| 8,401,219 B2 | * | 3/2013 | Hankey et al. | 381/384 |
| 8,405,512 B2 | * | 3/2013 | Johnson | 340/635 |
| 2003/0008553 A1 | * | 1/2003 | Oleynick et al. | 439/541.5 |
| 2008/0311765 A1 | * | 12/2008 | Chatterjee et al. | 439/38 |
| 2009/0108848 A1 | * | 4/2009 | Lundquist et al. | 324/538 |
| 2009/0124125 A1 | * | 5/2009 | Chatterjee | 439/607.05 |
| 2010/0298029 A1 | * | 11/2010 | Jang | 455/557 |

OTHER PUBLICATIONS

Philips Semiconductors—"AN10216-01 I2C Manual"; 51 pages, Dated Mar. 24, 2003.*

* cited by examiner

*Primary Examiner* — Brian Misiura
(74) *Attorney, Agent, or Firm* — Kilpatrick Townsend & Stockton LLP

(57) ABSTRACT

A communication port and connector are described. A mobile computing device may include a hardware element, with the hardware element being communicatively coupled to a connection. The connection is communicatively coupled to a communication port, and the communication port includes a first pin and a second pin. Additionally, at least one of the first pin and the second pin is comprised of a ferromagnetic material. Other embodiments are described and claimed.

18 Claims, 6 Drawing Sheets

COMMUNICATION PORT AND CONNECTOR

BACKGROUND

Embodiments of the present disclosure relate to the field of communication port systems. More particularly, the present disclosure relates to a system for extracting diagnostic information through a communication port system.

Information is desired from host devices that are in production or that are in the market. This information is used to develop or debug the host devices. The desired information may include diagnostic information. Oftentimes diagnostic information can only be extracted from a host device after making secondary modifications to the hardware of the host. These secondary modifications may include opening the housing of the host, drawing wires or connections from the main-board, and/or soldering wires to make additional connections. Then the wires or connections are connected to a custom connector to allow for extraction of diagnostic information. Once the information is extracted the host may be diagnosed. This may be referred to as "pulling out the UART."

However, due to the secondary modifications made to the hardware of the host after pulling out the UART, the host may become unusable as a generic device. Additionally, secondary modifications such as the soldering of wires may create an electrically noisy interface for the extraction of information and may make the host susceptible to breakage if the host is mishandled.

Thus, there exists a need for a communication port and connector to reduce the costs and time spent associated with pulling out the UART of a host device. Additionally, there exists a need for a communication port and connector for substantially reducing or eliminating the secondary modifications and the repercussions caused by the secondary modifications.

DETAILED DESCRIPTION

Figure 1:
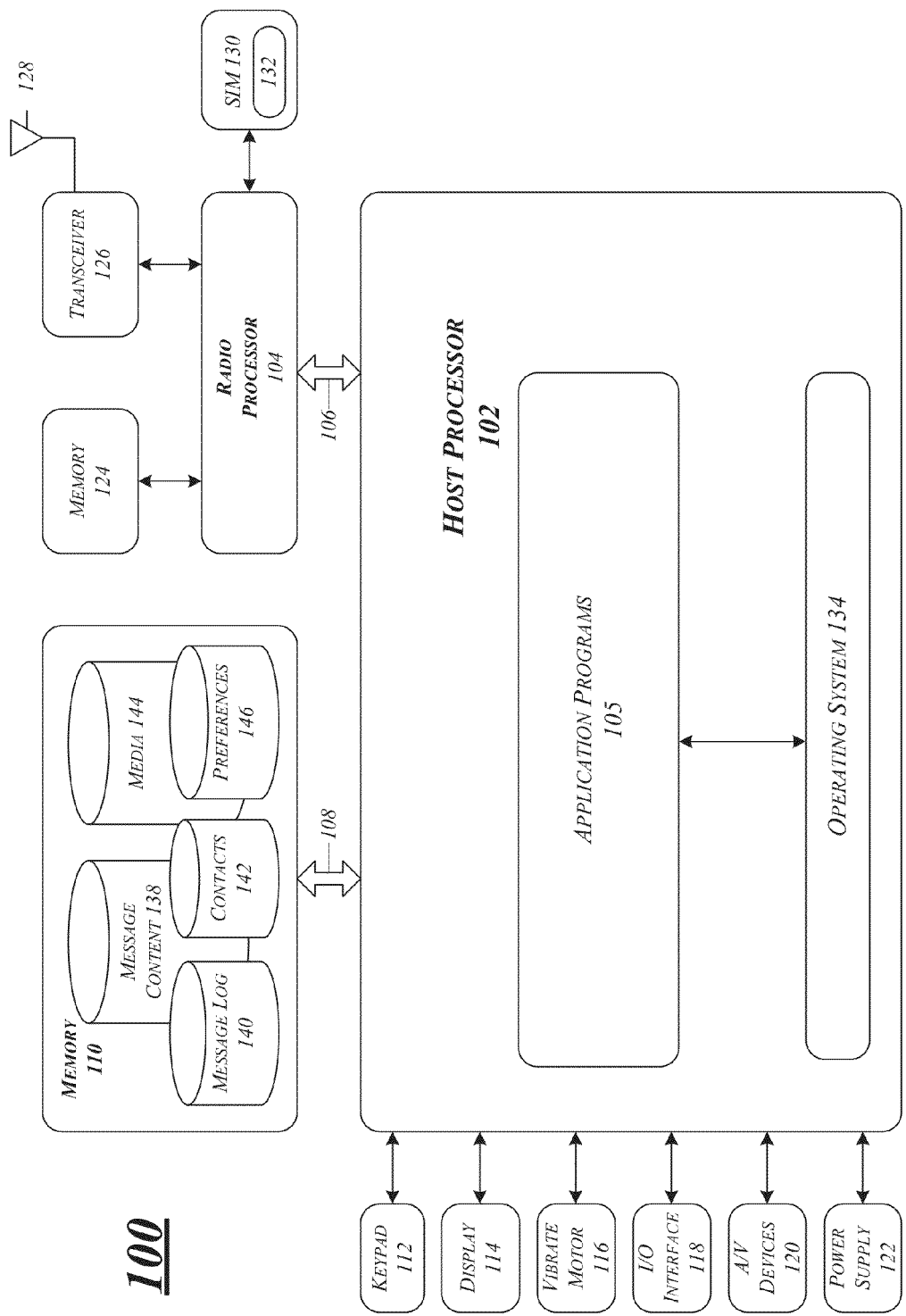
FIG. 1 illustrates an exemplary embodiment of an apparatus.

The present disclosure will now be described more fully hereinafter with reference to the accompanying drawings, in which various embodiments are shown. The various embodiments, however, may be implemented in many different forms and should not be construed as limited to the embodiments set forth herein. In the drawings like numbers refer to like elements throughout.

Embodiments may be generally directed to techniques for the exchange of diagnostic information with a serial connection. For instance, an apparatus may include a host device and one or more remote devices. The information may include data associated with one or more user applications and elements for the host and remote device. The serial connection may be a Universal Serial Bus (USB) connection or a serial connection. Embodiments may provide various advantages. For instance, features (such as the employment of the serial connection) may provide access to testing points while reducing costs associated with diagnostic testing. Moreover, such features may allow for devices (e.g., the host and remote device) to exchange information without having to directly connect and/or solder test wires to various test connections within the host.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrases "in an embodiment" or "in one embodiment" in various places in the specification are not necessarily all referring to the same embodiment.

FIG. 1 illustrates one embodiment of a host device 100. A host device may be a mobile computing device, mobile telephone, smartphone, personal digital assistant (PDA), notebook computer, and so forth. FIG. 1 illustrates a block diagram of an exemplary mobile computing device 100 suitable for implementing various embodiments, including a host device. It may be appreciated that the mobile computing device 100 is only one example of a suitable mobile computing environment and is not intended to suggest any limitation as to the scope of use or functionality of the embodiments. The mobile computing device 100 may not be interpreted as having any dependency or requirement relating to any one or combination of components illustrated in the exemplary mobile computing device 100.

The various elements that substantially comprise mobile computing device 100 will now be described. For example, one element, the host processor 102 may be responsible for executing various software programs such as system programs and applications programs 105 to provide computing and processing operations for the mobile computing device 100. Another element, the radio processor 104, may be responsible for performing various voice and data communications operations for the mobile computing device 100 such as transmitting and receiving voice and data information over one or more wireless communications channels. Although the mobile computing device 100 is shown with a dual-processor architecture, it may be appreciated that the mobile computing device 100 may use any suitable processor architecture and/or any suitable number of processors or number of processor cores in accordance with the described embodiments. In one embodiment, for example, the processors 102 and 104 may be implemented using a single integrated processor.

The host processor 102 may be implemented as a host central processing unit (CPU) using any suitable processor or logic device, such as a as a general purpose processor. The host processor 102 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of the host processor 102. In various embodiments, the mobile computing device 100 may comprise an expansion slot to support a multimedia and/or memory card, for example.

The memory 110 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 112 may comprise a physical keypad using hard buttons, or a virtual keypad using soft buttons displayed on a display 114. The keypad may also comprise a thumbboard.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive or touch screen color (e.g., 216-bit color) thin-film transistor (TFT) LCD screen. The touch-sensitive or touch screen LCD may be used with a stylus and/or a handwriting recognizer program.

The mobile computing device 100 may comprise a vibrating motor 116 coupled to the host processor 102. The vibrating motor 116 may be enabled or disabled according to the preferences of the user of the mobile computing device 100. When enabled, the vibrating motor 116 may cause the mobile computing device 100 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 100 may comprise an input/output (I/O) interface 118 coupled to the host processor 102. The I/O interface 118 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.), (WiFi) wireless capability, to enable wired (e.g., USB cable) and/or wireless connection to a local computer system or peripheral device, such as a local personal computer (PC). In various implementations, mobile computing device 100 may be arranged to synchronize information with a local computer system or peripheral device.

The host processor 102 may be coupled to various audio/video (A/V) devices 120 that support A/V capability of the mobile computing device 100. Examples of A/V devices 120 may include, for example, a microphone, one or more speakers (such as speaker system), an audio port to connect an audio headset, an audio coder/decoder (codec), an audio player, a Musical Instrument Digital Interface (MIDI) device, a digital camera, a video camera, a video codec, a video player, and so forth.

The host processor 102 may be coupled to a power supply 122 arranged to supply and manage power to the elements of the mobile computing device 100. In various embodiments, the power supply 122 may be implemented by a rechargeable battery, such as a removable and rechargeable lithium ion battery to provide direct current (DC) power, and/or an alternating current (AC) adapter to draw power from a standard AC main power supply.

The radio processor 104 may be arranged to communicate voice information and/or data information over one or more assigned frequency bands of a wireless communication channel. The radio processor 104 may be implemented as a communications processor using any suitable processor or logic device, such as a modem processor or baseband processor. The radio processor 104 may also be implemented as a digital signal processor (DSP), media access control (MAC) processor, or any other type of communications processor in accordance with the described embodiments. The radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 124 coupled to the radio processor 104. The memory 124 may be implemented using any of the computer-readable media described with reference to the memory 110. The memory 124 may be typically implemented as flash memory and synchronous dynamic random access memory (SDRAM). Although the memory 124 may be shown as being separate from the radio processor 104, some or all of the memory 124 may be included on the same IC as the radio processor 104.

The mobile computing device 100 may comprise a transceiver module 126 coupled to the radio processor 104. The transceiver module 126 may comprise one or more transceivers or radios, arranged to communicate using different types of protocols, communication ranges, operating power requirements, RF sub-bands, information types (e.g., voice or data), use scenarios, applications, and so forth. In various embodiments, the transceiver module 126 may comprise one or more transceivers arranged to support voice communications and/or data communications for the wireless network systems or protocols. In some embodiments, the transceiver module 126 may further comprise a Global Positioning System (GPS) transceiver to support position determination and/or location-based services.

The transceiver module 126 generally may be implemented using one or more chips as desired for a given implementation. Although the transceiver module 126 may be shown as being separate from and external to the radio processor 104 for purposes of illustration, it is worthy to note that in various embodiments some portion or the entire transceiver module 126 may be included on the same integrated circuit as the radio processor 104. The embodiments are not limited in this context.

The mobile computing device 100 may comprise an antenna system 128 for transmitting and/or receiving electrical signals. As shown, the antenna system 128 may be coupled to the radio processor 104 through the transceiver module 126. The antenna system 128 may comprise or be implemented as one or more internal antennas and/or external antennas.

The mobile computing device 100 may comprise a subscriber identity module (SIM) 130 coupled to the radio processor 104. The SIM 130 may comprise, for example, a removable or non-removable smart card arranged to encrypt voice and data transmissions and to store user-specific data for allowing a voice or data communications network to identify and authenticate the user. The SIM 130 also may store data such as personal settings specific to the user. In some embodiments, the SIM 130 may be implemented as an UMTS universal SIM (USIM) card or a CDMA removable user identity module (RUIM) card. The SIM 130 may comprise a SIM application toolkit (STK) 132 comprising a set of programmed commands for enabling the SIM 130 to perform various functions. In some cases, the STK 132 may be arranged to enable the SIM 130 to independently control various aspects of the mobile computing device 100.

As mentioned above, the host processor 102 may be arranged to provide processing or computing resources to the mobile computing device 100. For example, the host processor 102 may be responsible for executing various software programs including system programs such as operating system (OS) 134 and application programs 105. System programs generally may assist in the running of the mobile computing device 100 and may be directly responsible for controlling, integrating, and managing the individual hardware components of the computer system. The OS 134 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 100 may comprise other system programs such as device drivers, programming tools, utility programs, software libraries, application programming interfaces (APIs), and so forth.

Application programs 105 generally may allow a user to accomplish one or more specific tasks. In various implementations, the application programs 105 may provide one or more graphical user interfaces (GUIs) to communicate information between the mobile computing device 100 and a user. In some embodiments, application programs 105 may comprise upper layer programs running on top of the OS 134 of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 105 may include, without limitation, message applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Message applications may be arranged to communicate various types of messages in a variety of formats. Examples of message applications may include without limitation a cellular telephone application, a Voice over Internet Protocol (VoIP) application, a Push-to-Talk (PTT) application, a voicemail application, a facsimile application, a video teleconferencing application, an IM application, an email application, an SMS application, an MMS application, and so forth. It is also to be appreciated that the mobile computing device 100 may implement other types of applications in accordance with the described embodiments.

The mobile computing device 100 may include various databases implemented in the memory 110. For example, the mobile computing device 100 may include a message content database 138, a message log database 140, a contacts database 142, a media database 144, a preferences database 146, and so forth. The message content database 138 may be arranged to store content and attachments (e.g., media objects) for various types of messages sent and received by one or more message applications. The message log 140 may be arranged to track various types of messages which are sent and received by one or more message applications. The contacts database 142 may be arranged to store contact records for individuals or entities specified by the user of the mobile computing device 100. The media database 144 may be arranged to store various types of media content such as image information, audio information, video information, and/or other data. The preferences database 146 may be arranged to store various settings such as rules and parameters for controlling the operation of the mobile computing device 100.

Figure 2:
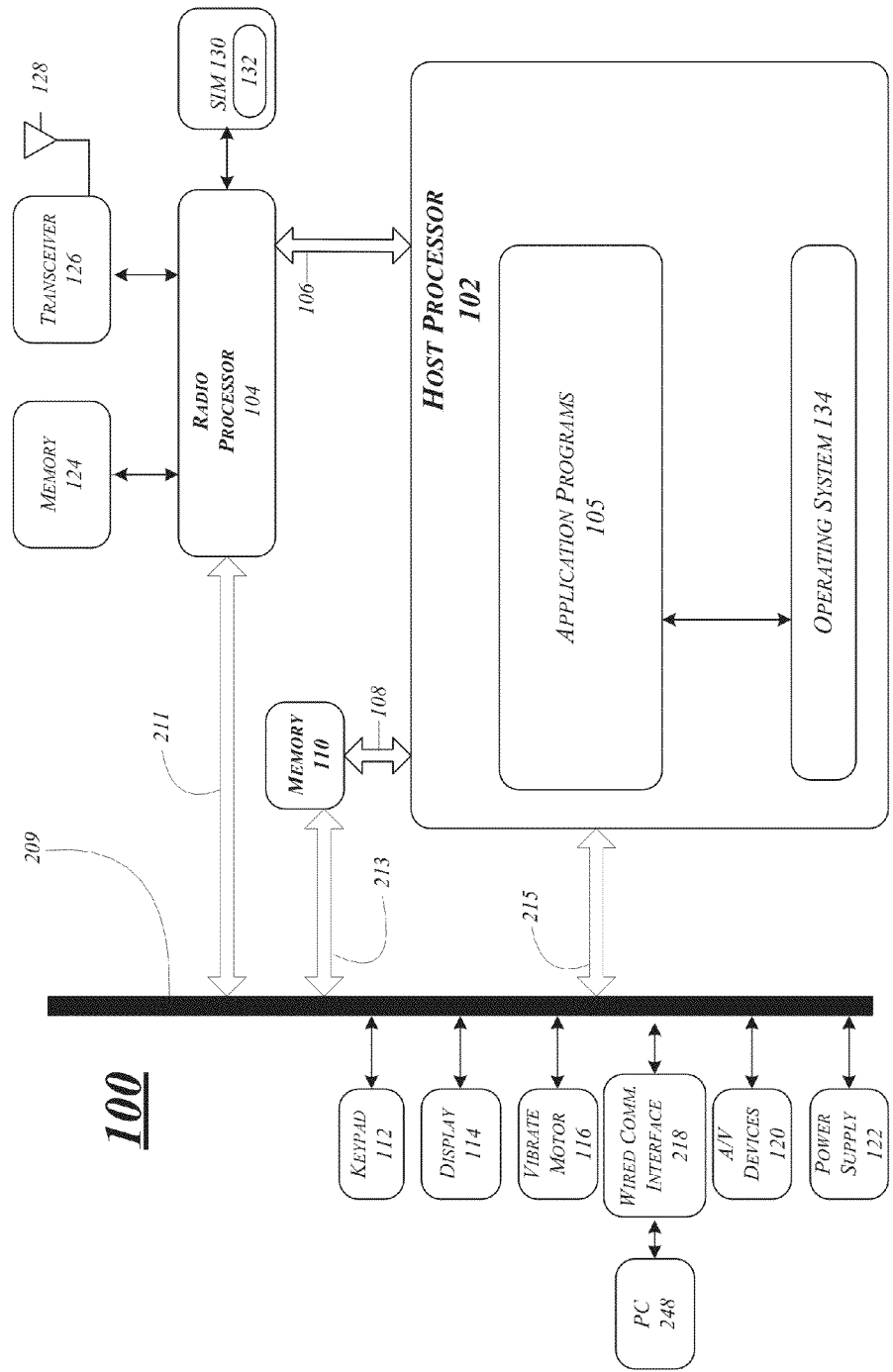
FIG. 2 illustrates an exemplary embodiment of an apparatus including an interconnection medium.

FIG. 2 illustrates the mobile computing device 100 including an interconnection medium 209. Generally, interconnection medium 209 of FIG. 2 provides for couplings among elements, such as the elements described above with reference to FIG. 1. The elements of FIG. 1 are also depicted in mobile computing device 100 of FIG. 2. Thus, interconnection medium 209 may include, for example, one or more bus interfaces. For example, the interconnection medium 209 may be coupled directly to memory 110 through bus 213, the radio processor 104 through buss 211, and the host processor through bus 215. The buses 211, 213, and 215 may comprise any suitable interface and/or bus architecture for allowing the interconnection medium 209 to access the radio processor 104, memory 110, and host processor 102, respectively. Exemplary interfaces include Universal Serial Bus (USB) interfaces, as well as various computer system bus interfaces. Additionally or alternatively, interconnection medium 209 may include one or more point-to-point connections (e.g., parallel interfaces, serial interfaces, etc.) between various element pairings. Such connections may comprise one or more signal lines. Moreover, interconnection medium 209 may include non-physical aspects. For instance, such interconnectivity may be implemented through messages passed between processes or software modules.

As illustrated in FIG. 2, the I/O interface 118 may be a wired communications interface 218. The wired communications interface 218 may provide for the exchange of information with a device 248 (e.g., a proximate device, such as a personal computer). This exchange of information may be across one or more wired connections. Examples of such connections include USB interfaces, parallel interfaces, and/or serial interfaces. The information exchanged with such proximate devices, may include but is not limited to, general data and/or diagnostic data pertaining to different elements of the mobile 100 as well as application data (e.g., e-mail, calendar entries, contact information, as well as other information associated with personal information management applications). In addition, such information may include various application files, and content (e.g., audio, image, and/or video).

Wired communications interface 218 may include various components, such as a transceiver and control logic to perform operations according to one or more communication protocols. In addition, wired communication interface 218 may include a communication port(s) to couple with a physical connector(s).

Figure 3:
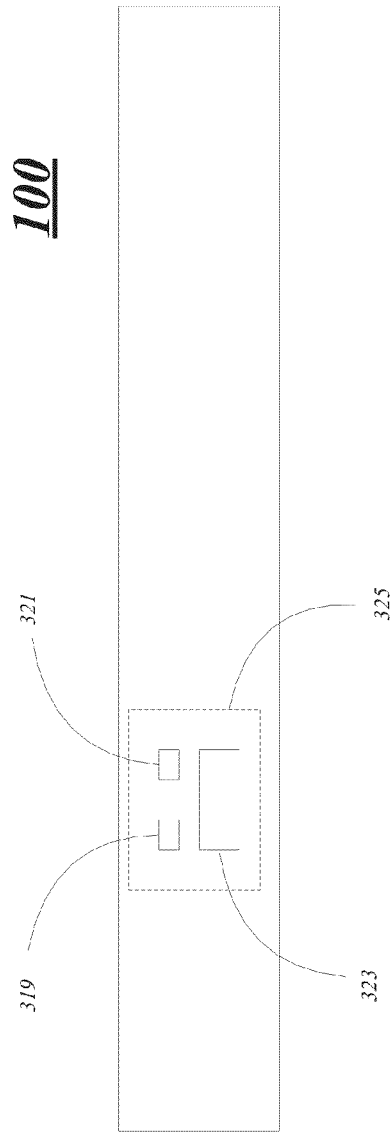
FIG. 3 illustrates an exemplary embodiment of a host including a communication port.

FIG. 3 illustrates the mobile computing device 100 having a communication port 325. The communication port 325 may include a USB port or micro USB port etc., and two additional pins. This type of communication port may implement a connector that is compatible with coupling to a first pin 319, second pin 321, and/or a USB port 323. The first pin 319 and second pin 321 may be constructed from a ferromagnetic material. The first pin 319, second pin 321, as well as the USB port 323 may also be communicatively coupled to wired communication interface 218.

The use of ferromagnetic material has several advantages. For instance, the ferromagnetic material may allow the pin or pins to attract, for example, magnetic covers for substantially covering the port and/or pins. The ferromagnetic material may also allow for orientation of parts of a protective case that provides protection for sensitive parts of a connector. The ferromagnetic material may further allow a convenient way to couple together various parts of a complex connector. Although some embodiments are described using ferromagnetic material, it may be appreciated that the ferromagnetic material can be replaced with any conductive material to form a conductive point in reasonably close proximity to a primary connector (e.g., USB). The embodiments are not limited in this context.

Figure 4:
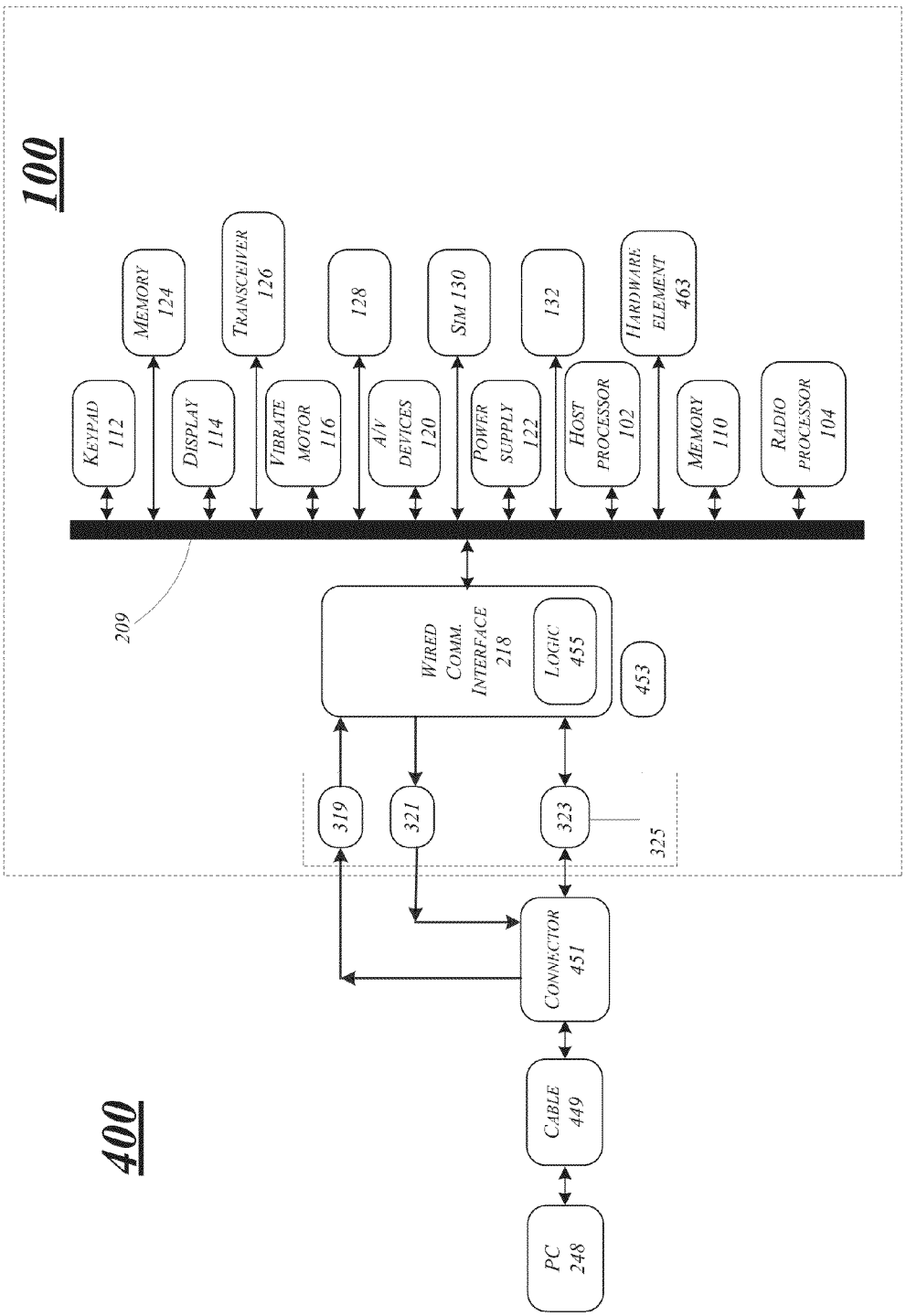
FIG. 4 illustrates an exemplary embodiment of a serial connection between a peripheral device and a host.

FIG. 4 illustrates an exemplary logic diagram 400. The logic diagram 400 of FIG. 4 may illustrate one or more interfaces that may employ various techniques to exchange information between the elements of the mobile computing device 100 and a PC 248. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In particular, FIG. 4 illustrates an example serial connection between PC 248 and one or more elements of mobile computing device 100. As described above with reference to FIG. 1 and FIG. 2, the elements of mobile computing device 100 are communicatively coupled to interconnection medium 209. Thus, to obtain diagnostic information from the elements of mobile computing device 100 the PC 248 is communicatively coupled to serial connection cable 449. The serial connection cable 449 and/or PC 248 may support different communication protocols such as for example USB, parallel, or serial protocols. As described above with reference to FIG. 3, a connector 451 may be implemented to couple with a first pin 319, second pin 321, and/or a USB port 323 of wired communications interface 218. As described above with reference to FIG. 2, wired communications interface 218 may include various components, such as a transceiver and control logic 455 to perform operations according to one or more communication protocols. As such, wired communication interface 218 may be communicatively coupled with one or more elements through interconnection medium 209.

Figure 6:
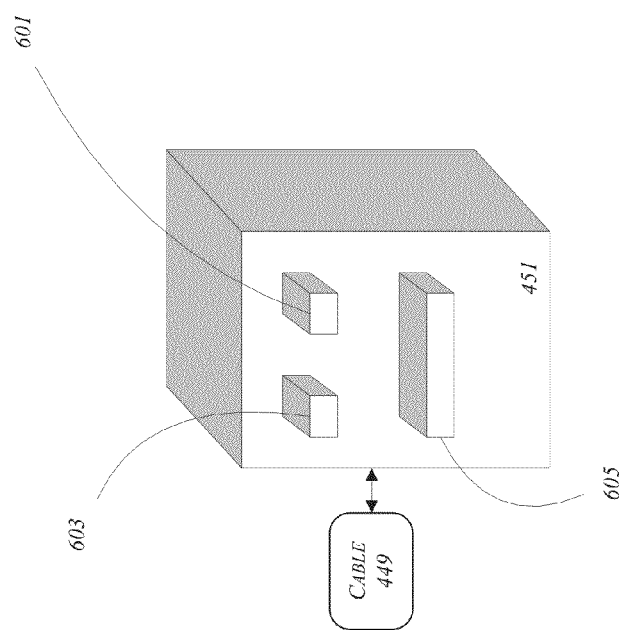
FIG. 6 illustrates an exemplary embodiment of a cable and connector.

More specifically, the serial connection between PC 248 and communication port 325 may include a connector 451 communicatively coupled to cable 449. As illustrated in FIG. 6 the connector 451 may comprise, for example, a first conductor 601 and/or a second conductor 603. The first and second conductors may be substantially coupled to the first pin 319 and/or second pin 321 to transfer information (e.g., data and control directives etc.) between the mobile computing device 100 and PC 248. The first pin 319 may be used to transmit information from the PC 248 to an element on the mobile computing device 100. The second pin 321 may be used to receive data from mobile computing device 100. In addition to the pair of conductors a third conductor 605 may be coupled to, for example, the USB port 323. Third conductor 605 may be coupled to ground 453 through USB port or micro USB port 323. Additionally, third conductor 605 may be implemented as a USB or micro USB conductor for USB communications and coupling with a USB port or micro USB port 323. However, the embodiments are not limited in this manner.

In the embodiments, the serial connection(s) created between the PC 248 and elements of mobile computing device 100 may be implemented in accordance with USB conventions (e.g., in accordance with USB version 2.0). However, embodiments may employ other USB versions (e.g., USB version 1.1, etc.), as well as other serial interface types. In transferring signals across the serial connection, embodiments may use signal levels other than the transceiver signal levels specified by the employed interface type. For example, USB specifies transceiver signal levels of 0.0-0.3 volts for a logical low level and 2.8-3.6 volts for a logical high level. However, embodiments may employ different (e.g., lower) voltage levels for signals based on the length of the serial connection.

Also, the exchange of information across the serial connection may occur across multiple "pipes" or logical channels between the wired communication interface 218 and PC 248. Such information exchanges may be asynchronous. Also, such information exchanges may occur when element(s) of the mobile computing device 100 and elements of the personal computer 248 employ different clock rates.

Moreover, wired communication interface 218 may be implemented with multiple (e.g., three) functional layers. As specified by USB standards, such layers may include (from low to high) a USB bus interface layer, a USB system layer, and a client layer. These layers may be implemented in hardware, software, firmware, or any combination thereof.

The USB bus interface layer handles electrical and protocol layer interactions across the serial connection to and from PC 248. The USB bus interface layer may include a host controller and a serial interface engine (SIE). The host controller manages data transfers between the host and USB devices. Further, the host controller provides an integrated root hub providing attachment points to serial connection.

The SIE serializes data to be transmitted across the cable 449 and connector 451. Also, the SIE deserializes data received from serial connection or cable 449 and connector 451. PC 248 may also include similar SIE features.

The USB system layer (in conjunction with the host controller of USB bus interface module), performs translation between the client layer's view of data transfers and the USB transactions across the serial connection. The USB system layer also manages USB resources, such as bandwidth and bus power. The USB system layer may include a host controller driver (HCD), a USB driver (USBD), and host software.

Within connection host module 218, the client layer exchanges information with the USB system layer. Also, the client layer exchanges information with elements 102-132 or any hardware element 463.

In embodiments, the USB bus interface layer, the USB system layer, and the client layer may provide further or alternative features. Also, embodiments may employ approaches employing greater or fewer layers, as well as non-layered approaches.

Figure 5:
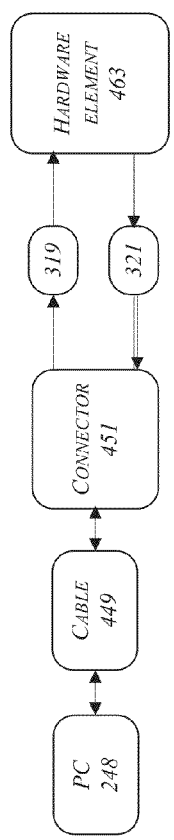
FIG. 5 illustrates an exemplary embodiment of a serial connection between a peripheral device and a hardware element.

FIG. 5 illustrates one logical exemplary embodiment employing a less complicated connection(s) than the use of a backplane bus architecture(s) illustrated in FIG. 4. Here the PC 248 may use a serial connection employing for example a serial protocol to communicate directly with any element or hardware element 463 of mobile computing device 100. The PC 248 is communicatively coupled with the cable 449, and the cable is coupled to the connector 451. The connector 451 may be electrically coupled with first pin 319 for transmitting information to hardware element 463. Additionally, the connector 451 may be electrically coupled with second pin 321 for receiving information from hardware element 463. By implementing a serial connection as illustrated in FIG. 5, it may substantially reduce power consumption, implementation costs, and complexity in sending and receiving information with hardware elements pertaining to mobile computing devices 100. Moreover, by implementing the serial connection of FIG. 5 or serial connection(s) of FIG. 4 software development and troubleshooting may be simplified. For instance, using the connection(s) employed in FIG. 4 and FIG. 5, may avoid the implementation of interfaces employing more complicated handshaking protocols. Additionally, implementing the ferromagnetic pins 319 and 321 as described above may substantially reduce the costs associated with employing secondary modifications and simplify the procedures currently used to obtain data including, for example, diagnostic information from elements or desired testing points of a mobile computing device.

As described above, embodiments may communicate across various types of wireless links, such as data networking links, personal area networking (PAN) links, and/or links provided by cellular systems.

Examples of data networking links include wireless local area network (WLAN) links, such as IEEE 802.11 WiFi links. Further examples include wireless metropolitan area (WMAN) links, such as IEEE 802.16 WIMAX links. Examples of PAN links include ad-hoc proximity network links, such as Bluetooth links. The embodiments, however, are not limited to these examples.

Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, radio module 108 may additionally or alternatively communicate across non-cellular communications links.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a hardware element;
   a connection communicatively coupled to the hardware element;
   a communication port communicatively coupled to the connection, the communication port having a first pin and a second pin; and
   at least one of the first pin and the second pin comprising a ferromagnetic material, the ferromagnetic material to obtain diagnostic information from the mobile computing device;
   wherein the first pin to transmit only control directives to an element on the mobile computing device and the second pin to receive diagnostic data from the mobile computing device, and
   wherein the communication port further comprises a universal serial bus port adjacent to the first and second pins.

2. The mobile computing device of claim 1, wherein the universal serial bus port is coupled to ground.

3. The mobile computing device of claim 1, wherein the communication port further comprises a micro universal serial bus port adjacent to the first and second pins.

4. The mobile computing device of claim 1, wherein the communication port is operative to communicate with the hardware element over the connection by serial communication.

5. The mobile computing device of claim 1, wherein the communication port is operative to communicate with the hardware element over the connection by parallel communication.

6. The mobile computing device of claim 1, wherein the communication port is operative to communicate with the hardware element over the connection by serial communication or universal serial bus communication.

7. The mobile computing device of claim 1, wherein the first pin and second pin are directly coupled to the hardware element.

8. The mobile computing device of claim 1, wherein the hardware element comprises a memory, transceiver, antenna, radio processor, SIM, host processor, keypad, display, vibrate motor, input/output interface, audio/visual device, or power supply.

9. A connector comprising;
   a first conductor and a second conductor to be substantially coupled to at least one of a first or second ferromagnetic pin for communicating diagnostic information with a first type of communication; and
   a third conductor adjacent to the first conductor or second conductor, the third conductor for communicating data packets with a second type of communication,
   wherein the first conductor to transmit only control directives to an element on the mobile computing device and the second conductor to receive diagnostics data from the mobile computing device, and
   wherein the third conductor is a universal serial bus plug capable of coupling to a ground connection.

10. The connector of claim 9, wherein the first type of communication is serial communication.

11. The connector of claim 9, wherein the first type of communication is parallel communication.

12. The connector of claim 9, wherein the second type of communication is a universal serial bus communication.

13. A mobile computing device, comprising:
    a wired communication interface;
    an interconnection medium communicatively coupled to the wired communication interface;
    a hardware element communicatively coupled to the interconnection medium; and
    a communication port communicatively coupled to the wired communication
    interface, the communication port having a first pin, second pin, and a universal serial bus port, wherein the first pin or the second pin further comprise of a ferromagnetic material to communicate diagnostic information and the first pin to transmit only control directives to an element on the mobile computing device and the second pin to receive diagnostics data from the mobile computing device.

14. The mobile computing device of claim 13, wherein the wired communication interface further comprises control logic to perform operations according to one or more communication protocols.

15. The mobile computing device of claim 14, wherein the control logic performs operations according to a serial communication protocol, parallel communication protocol, or universal serial bus communication protocol.

16. The mobile computing device of claim 13, wherein the first and
    second pins are operative to communicate with the hardware element over the wired communication interface and interconnection medium by serial communication, and the universal serial bus communication port is operative to communicate with the hardware element over the wired communication interface and interconnection medium by universal serial bus communication.

17. The mobile computing device of claim 13, wherein the universal serial bus port is coupled to ground.

18. The mobile computing device of claim 1, wherein the first pin supports unidirectional communication from the mobile computing device to the hardware element and the second pin supports unidirectional communication from the hardware element to the mobile computing device.

* * * * *